Patented June 26, 1934

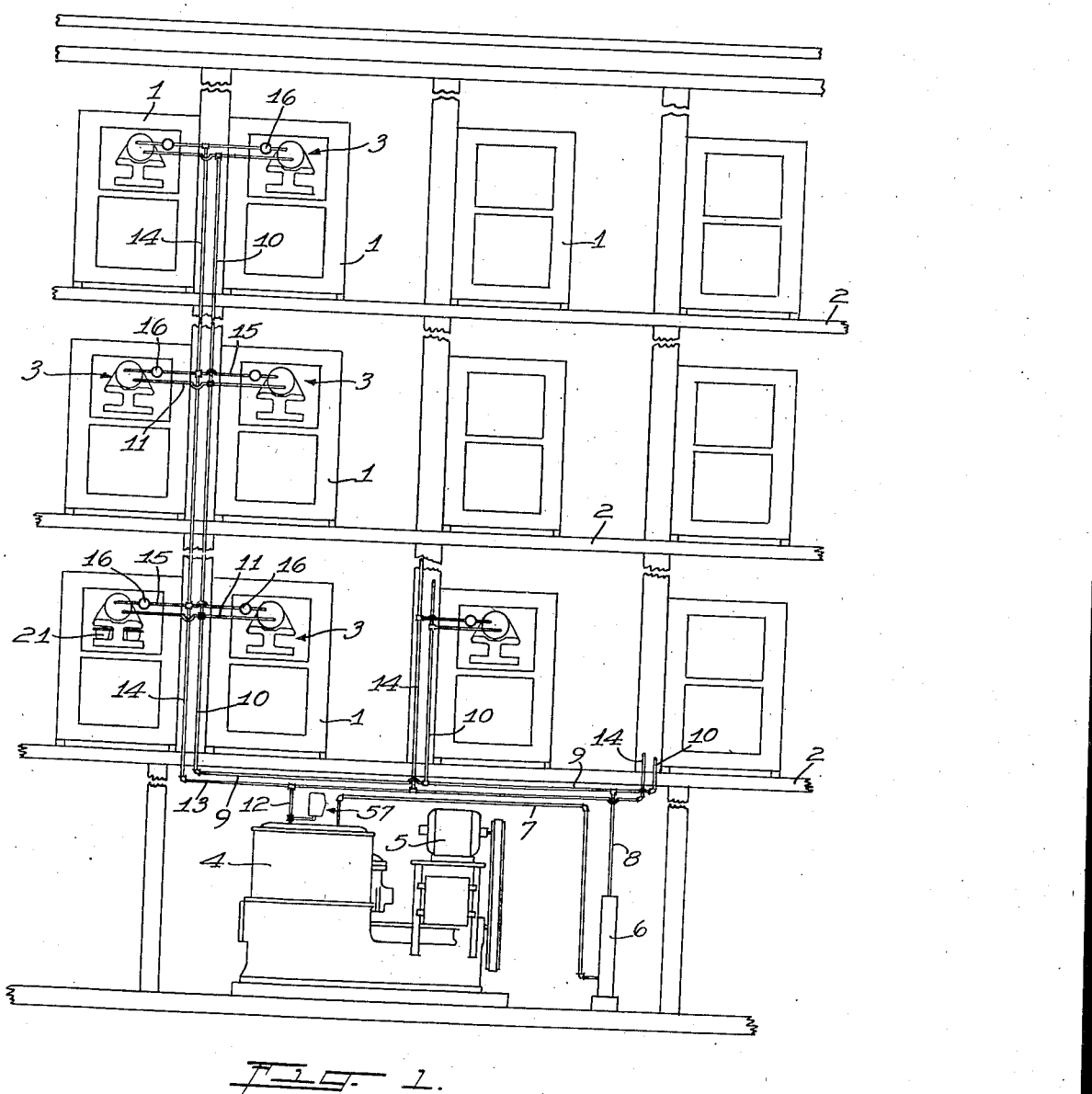

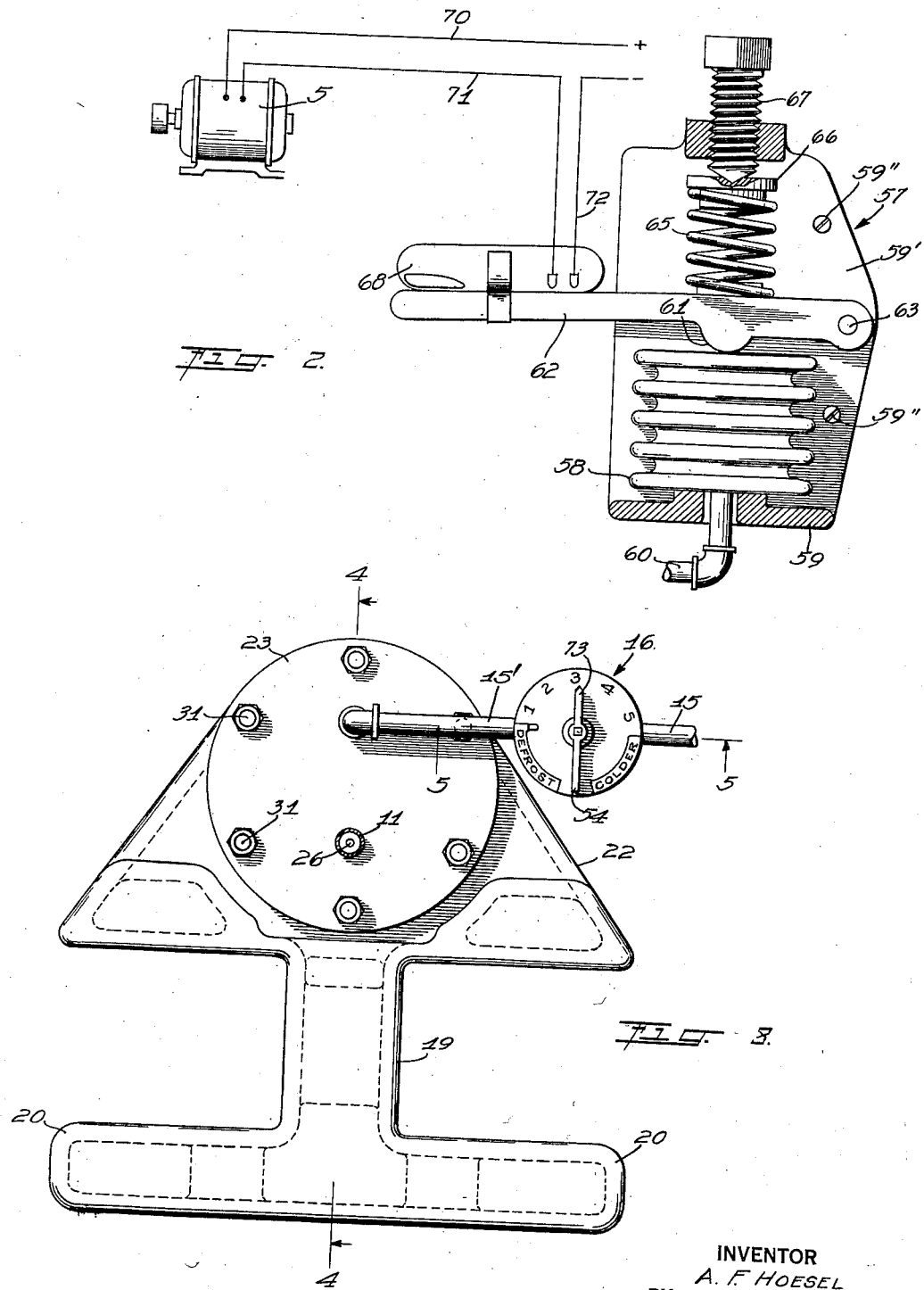

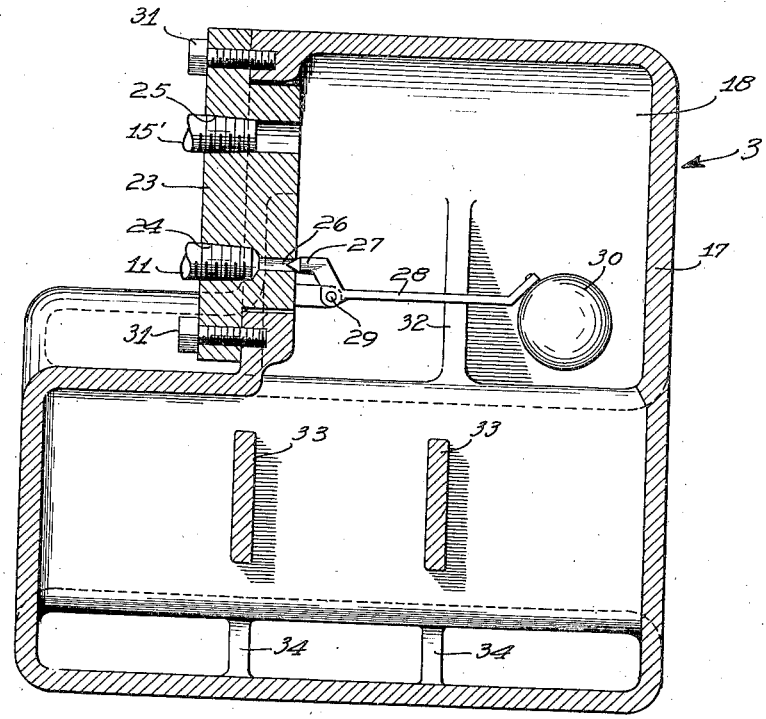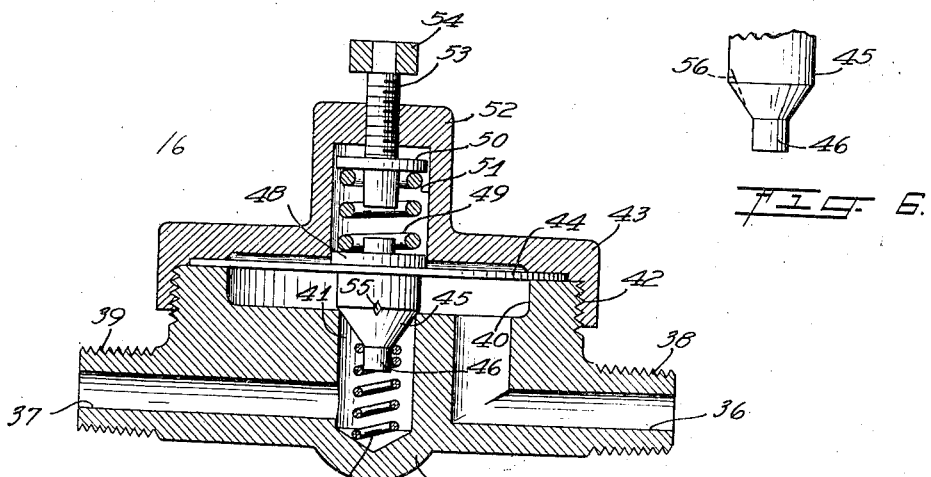

1,964,636

UNITED STATES PATENT OFFICE 1,964,636

TEMPERATURE CONTROL FOR REFRIGERATING SYSTEMS

Anthony F. Hoesel, Chicago, Ill., assignor to Peerless Ice Machine Company, Chicago, Ill.

Application April 1, 1929, Serial No. 351,708

2 Claims. (Cl. 62—3)

My invention relates to temperature controls for refrigerating systems and more particularly to those used in apartment house refrigeration and termed "multiple refrigerating systems", and it consists in the combinations, constructions, and arrangements herein described and claimed.

An object of my invention is to provide means whereby the temperature of any one or more of the plurality of cooling units may be varied within certain limits without greatly affecting the temperature of the remaining cooling units.

A further object is to provide means whereby any one or more of a plurality of cooling units may be defrosted without the necessity of stopping the compressor or otherwise affecting the temperature of the remaining cooling units.

Other objects and advantages will appear in the following specification, and the novel features of the invention will be particularly pointed out in the appended claims.

My invention is illustrated in the accompanying drawings forming part of this application, in which Figure 1 is a diagrammatic view of a refrigerating system embodying my invention, Figure 2 is an enlarged detail view, partly in section, of a switch control device responsive to pressure variations in the vapor conduit system, Figure 3 is an end elevation of one of the cooling units showing a pressure control operatively connected therewith, Figure 4 is a sectional view taken substantially along the line 4—4 of Figure 3, Figure 5 is an enlarged sectional detail view of the pressure control taken substantially along the line 5—5 of Figure 3, and Figure 6 is a detail view of a portion of a modified form of the valve which is associated with the pressure control.

In carrying out my invention I make use of a series of refrigerators 1 which are mounted upon a series of floors 2. Each of the refrigerators 1 is provided with a cooling unit 3. A compressor 4, which is operated by a motor 5, is associated with the refrigerators 1, as shown in Figure 1. The compressor 4 is operatively connected with a condenser 6 by means of a pipe 7. A pipe 8 leads from the condenser 6 to a main pipe 9 provided with a plurality of main lines 10 which pass to the various floors. Branch lines 11 connect the cooling units 3 with the main lines 10. The pipe lines so far described may be termed the liquid conduit system.

The compressor 4 is also provided with a pipe 12 connected with a main pipe 13. A plurality of main pipes 14 is connected with the main pipe 13. Branch pipes 15 operatively connect the cooling units 3 with the pipe lines 14. The pipe lines 12, 13, 14, and 15 may be termed the vapor conduit system. A pressure control device 16 is associated with each of the cooling units 3 as shown generally in Figure 1 and as shown in Figure 3.

Referring now to Figures 3 and 4 it will be seen that the cooling units 3 comprise a hollow body portion 17 formed to provide a float chamber 18. The body portion is narrowed as at 19 and is provided with laterally extending portions 20 arranged for supporting pans 21, see Figure 1. The pans may be used as containers for water which is to be frozen. The upper portion of the body portion 17 is provided with inclined walls 22, see Figure 3, and in referring to Figure 4 it will be noted that the upper part of the body portion is shorter than the lower portion. A cover plate 23 is arranged for closing the open end of the upper portion of the body. The cover 23 is provided with an opening 24, see Figure 4, arranged to receive one of the branch pipes 11 associated with the liquid conduit system.

The cover 23 is also provided with a second opening 25 arranged to receive a pipe 15' for placing the pressure control 16, shown in Figure 3, in communication with the interior of the cooling unit. The pressure control is connected with one of the branch pipes 15. The branch pipe 11 is also in communication with the float chamber 18 through the medium of a passageway 26. The passageway 26 may be closed by means of a valve 27 associated with a float lever 28 which is pivotally mounted at 29 upon the cover 23. A float 30 is secured to the float arm 28. The cover 23 is secured to the body portion 17 by means of bolts or screws 31. The interior of each cooling unit is provided with a plurality of reinforcing ribs 32, 33, and 34.

The pressure control 16 comprises a valve body 35 provided with passageways 36 and 37 operatively connected to the pipes 15 and 15', respectively. The valve body 35 is provided with threaded extensions 38 and 39 for receiving the threaded end portions of the pipes 15 and 15' respectively. Figure 3 shows the pipes 15 and 15' connected with the pressure control 16. The valve body 35 is provided with an enlarged recess 40 which is in communication with the passageway 37 by means of an opening 41. The passageway 36 communicates with the recess 40. The valve body 35 is threaded at 42 to receive a cap 43. A diaphragm 44 is disposed between the cap and the valve body and firmly held in position when the cap 43 is screwed down upon the valve body.

A valve 45 is associated with the diaphragm and is provided with a reduced portion 46 for guiding one end of a compression spring 47. The opposite end of the spring is disposed within the tapered end of the opening 41. A spring support 48 is secured to the diaphragm for supporting one end of a compression spring 49. A second spring support 50 is disposed within an opening 51 in an extended portion 52 of the cap 43. The spring 49 is disposed between the two spring supports. One end of an adjusting screw 53 bears against the spring support 50 and is provided with a lever 54, see Figures 3 and 5. The valve 45 may be provided with a relatively small opening 55 for placing the passageway 36 in restricted communication with the passageway 37 in order that the gas which has evaporated in the cooling unit may pass from the pipe 15' to the pipe 15 and thereafter to the compressor 4, as will be hereinafter described. In Figure 6 I have shown the valve 45 as being provided with a slot 56 in lieu of the opening 55.

The valve 45 is arranged to close the opening 41. It may be desirable to machine the valve in such a manner as to prevent its making a tight joint with its mating seat. In referring now to Figures 1 and particularly 2 it will be seen that I have provided a switch control 57 which is operatively connected with the vapor conduit system. The switch control comprises a bellows 58 mounted upon a bracket 59 associated with a frame 59'. A pipe 60 places the bellows in communication with the pipe 12 associated with the compressor 4. One end of the bellows engages a cam portion 61 associated with a switch arm 62 which is pivotally mounted at 63 upon the frame 59'. The switch arm is provided with a lug 64 arranged to guide one end of a bellows spring 65. The opposite end of this spring is in engagement with a spring guide 66 which is in engagement with an adjusting screw 67. The frame 59' may be mounted upon any suitable supporting structure by means of bolts or screws 59''. The switch arm 62 is provided with a mercury tube switch 68.

In Figure 2 I have shown the compressor motor 5 as having a conductor 70 connected with a suitable source of current, and a conductor 71 which leads to the mercury tube switch. A conductor 72 leads from the switch 68 to the source of current. The mercury within the switch 68 is adapted to bridge the conductors 71 and 72 for closing the circuit through the motor 5 as will be more fully explained hereinafter.

From the foregoing description of the various parts of the device, the operation thereof may be readily understood. In operation when the compressor 4 is working, the refrigerant vapor within the vapor conduit system and the cooling units will be forced into the condenser 6 where it is cooled and liquefied. The liquid within the condenser is forced into the pipe 8 and through the entire liquid conduit system. Thus it will be seen that the refrigerant liquid may be passed into the cooling units through the pipes 11. Since each of the cooling units is identical in operation and construction, the description will be confined to a single unit. In referring to Figure 4 it will be seen that the refrigerant liquid will pass into the float chamber 18 through the passageway 26. When the liquid within the cooling unit reaches a certain level the float 30 will be lifted for moving the valve 27 into closing engagement with its valve seat which is associated with the passageway 26. The liquid within the cooling unit will, of course, vaporize and pass therefrom through the pipe 15' and the pressure control 16 and into the vapor conduit system. Let us assume that in the present instance I am using methyl cloride as a refrigerant. Due to the vaporization in the cooling unit, the vapor will, due to heat flow, gradually build up in pressure and pass through the opening 55 in the valve 45 which will build up the vapor pressure in the vapor conduit system. When a certain amount of pressure has been built up the diaphragm 44 will be lifted against the pressure of the spring 49 for opening the valve 45.

The bellows 58 is responsive to the pressure in the vapor conduit system and is opposed in its upward movement by reason of the spring 65. The adjusting screw 67 permits the tension in the spring 65 to be changed for varying the sensitiveness of the switch arm 62. Whenever the vapor pressure in the conduit system reaches let us say twenty pounds gauge, the bellows associated with the switch control will lengthen and move the switch arm upwardly against the tension of the spring 65 whereby the mercury will flow into contact with the terminals associated with the conductors 71 and 72 for electrically connecting the two conductors thereby starting the compressor motor which operates the compressor.

The operation of the compressor will lower the pressure within the vapor conduit system. Let us assume that the levers 54 are disposed in the position shown in Figures 3 and 5. Whenever the vapor pressure within the vapor conduit system drops to, let us say, ten pounds gauge, the pressure spring 49 forces the diaphragm 44 against the vapor pressure within the vapor conduit system thereby closing the valve 45 and throttling the flow of vapor from the cooling unit or units to the vapor conduit system until such time as the pressure within the vapor conduit system has increased sufficiently to force the diaphragm against the pressure of the spring 49, thereby allowing the valve 45 to open and again establish full communication between the cooling unit or units and the vapor conduit system. The switch control 57 is adjusted by means of the adjusting screw 67 for permitting the switch arm 62 to be lowered sufficiently far for breaking the electrical contact when the pressure in the vapor conduit system drops to, let us say, five pounds gauge, thereby stopping the operation of the compressor until the pressure in the vapor conduit system again builds up to, let us say, twenty pounds gauge.

Whenever all of the pressure controls 16 are set in the position shown in Figure 3 the compressor in its operation will drop the pressure in the cooling units to, let us say, ten pounds gauge, at which point the pressure controls act to throttle the flow of vapor from the cooling units thereby permitting the compressor to readily exhaust the pressure in the conduit system to, let us say, five pounds gauge, at which point the switch control 57 is actuated for stopping the operation of the compressor. It is a well recognized fact in the regrigerating art that the temperature of the refrigerant liquid bears a relation to its pressure. In other words, a lowering of the pressure is accompanied by a lowering of the temperature and vice versa. When it is desired to attain a lower temperature in one of the cooling units the lever 54 may be moved in a clockwise direction thereby decreasing the pressure of the spring 49, see Figure 5, on the diaphragm 44 for permitting the cooling unit to attain a lower pressure and temperature. This lower temperature is, of course, within the pressure limits to which the switch control 57 is set to stop the compressor in its operation.

When a cooling unit has been used a certain length of time the unit will accumulate a heavy frost deposit which materially reduces the heat absorption. It frequently becomes necessary to defrost the unit. Whenever the lever 54 is turned in a clockwise direction so that the indicating point 73 of the lever 54 will be located at the position marked "defrost", the extended portions of the spring supports 48 and 50 will engage for holding the valve 45 in a closed position. At this time the diaphragm 44 becomes non-responsive to the vapor pressure in the vapor conduit system and the heat absorption in the cooling unit defrosts the unit after a sufficient period of time has elapsed.

It will be understood, of course, that the pressures stated above are not to be construed as other than as an example for defining the operation of my invention. Such pressures would, of course, vary according to the different refrigerants used and also according to the different conditions of operation met with in the use of any particular refrigerant.

I claim:

1. Refrigerating apparatus comprising a plurality of cooling units, a compressor, refrigerant supply and vapor return conduit systems establishing communication between said compressor and said units, a valve for each of said units in said vapor return system having a constantly open passage therein for the flow of vapor from the respective units to said return system, a control device responsive to the pressure of said return system adapted to effect the operation of said compressor upon the building up of a predetermined maximum vapor pressure within said return system and to stop said compressor upon the reduction of the pressure to a predetermined minimum limit, said valve having means responsive to pressures between said maximum and minimum limits tending to open the same to provide for increased flow of vapor from said units into said return system, and manually operable means for regulating the opening of said valves by the respective pressure responsive means.

2. Refrigerating apparatus comprising a cooling unit, a compressor, refrigerant delivery and vapor return conduits providing communication between said compressor and unit, a valve in the return conduit having a passage for the continuous flow of a minimum quantity of vapor from said unit to said vapor return conduit, said valve having pressure responsive means subjected to the pressure prevailing in said return conduit tending to open said valve to provide increased flow of vapor from said unit, manual means for closing said valve and for regulating the opening of the same by said pressure responsive means, a device for controlling the operation of said compressor for maintaining the pressure of the vapor in said return conduit below a predetermined maximum and above a predetermined minimum capable of actuating said responsive means of said valve to open position an extent determined by said manual means.

ANTHONY F. HOESEL.